United States Patent
Feng

(10) Patent No.: US 12,326,709 B2
(45) Date of Patent: Jun. 10, 2025

(54) METHOD AND DEVICE FOR TESTING PRODUCT, COMPUTER DEVICE AND READABLE STORAGE MEDIUM

(71) Applicant: Saimeite Technology Co., Ltd., Jiangsu (CN)

(72) Inventor: Liang Feng, Jiangsu (CN)

(73) Assignee: Saimeite Technology Co., Ltd., Jiangsu (CN)

( * ) Notice: Subject to any disclaimer, the term of this patent is extended or adjusted under 35 U.S.C. 154(b) by 371 days.

(21) Appl. No.: 17/943,905

(22) Filed: Sep. 13, 2022

(65) Prior Publication Data
US 2023/0213911 A1 Jul. 6, 2023

(30) Foreign Application Priority Data
Jan. 6, 2022 (CN) .......................... 202210010175.5

(51) Int. Cl.
*G05B 19/406* (2006.01)

(52) U.S. Cl.
CPC .. *G05B 19/406* (2013.01); *G05B 2219/31316* (2013.01)

(58) Field of Classification Search
None
See application file for complete search history.

(56) References Cited

U.S. PATENT DOCUMENTS 6,457,148 B1 * 9/2002 Yoshiba ........... G01R 31/31937
365/201

6,513,138 B1 * 1/2003 Ohsawa ........... G01R 31/31813
714/720

(Continued)

FOREIGN PATENT DOCUMENTS

| CN | 104808597 A | 7/2015 |
| CN | 109544352 A | 3/2019 |

(Continued)

OTHER PUBLICATIONS

The State Intellectual Property Office of People's Republic of China, "First Office Action" in Application No. 202210010175.5, Dec. 3, 2024, 15 pages.

*Primary Examiner* — Hua Lu
(74) *Attorney, Agent, or Firm* — Davis Wright Tremaine LLP

(57) ABSTRACT

Provided are method and device for testing product, computer device and readable storage medium, wherein in the first testing stage of testing cycle, for each processing machine, the total product number and the tested-product number of products processed by the processing machine are counted; the product testing rate of each processing machine is calculated; in the second testing stage, when machine with product testing rate lower than the preset threshold and machine with the product testing rate higher than the preset threshold appear, products in unprocessed products that meet the preset sampling rule are transferred to the processing machine whose product testing rate is lower than the preset threshold for being processed, and products that do not meet the preset sampling rule are transferred to the processing machine with the product testing rate higher than the preset threshold for being processed, until end of the testing cycle.

9 Claims, 3 Drawing Sheets

(56) References Cited

U.S. PATENT DOCUMENTS

| | | | |
|---|---|---|---|
| 7,340,359 B2* | 3/2008 | Erez | G11C 29/56 700/121 |
| 2001/0026486 A1* | 10/2001 | Ogawa | H01L 22/22 365/201 |
| 2002/0048191 A1* | 4/2002 | Ikehashi | G11C 29/52 365/185.22 |
| 2004/0122548 A1* | 6/2004 | Lin | G05B 19/41875 700/121 |
| 2005/0034044 A1* | 2/2005 | Niijima | G01R 31/3191 714/742 |
| 2005/0095774 A1* | 5/2005 | Ushiku | G05B 19/41885 438/222 |
| 2006/0226871 A1* | 10/2006 | Ito | H03K 3/356139 326/38 |
| 2010/0048142 A1* | 2/2010 | Hou | G01R 31/31725 455/67.13 |
| 2011/0251812 A1* | 10/2011 | Gurov | G01R 31/2894 702/82 |
| 2016/0041212 A1* | 2/2016 | Darbinyan | G01R 31/31708 327/33 |
| 2017/0063490 A1* | 3/2017 | Liu | H04B 5/20 |
| 2018/0348291 A1* | 12/2018 | Teplinsky | H01L 22/00 |
| 2020/0173895 A1* | 6/2020 | Pope | G01N 3/06 |
| 2023/0176766 A1* | 6/2023 | Jeon | G06F 3/0679 |

FOREIGN PATENT DOCUMENTS

| | | |
|---|---|---|
| CN | 112185831 A | 1/2021 |
| JP | 2013000850 A | 1/2013 |

* cited by examiner

METHOD AND DEVICE FOR TESTING PRODUCT, COMPUTER DEVICE AND READABLE STORAGE MEDIUM

CROSS-REFERENCE TO RELATED APPLICATIONS

This application claims priority to Chinese Patent Application No. 202210010175.5, filed Jan. 6, 2022, entitled "METHOD AND DEVICE FOR TESTING PRODUCT, COMPUTER DEVICE AND READABLE STORAGE MEDIUM," the disclosure of which is hereby incorporated herein in its entirety.

TECHNICAL FIELD

The present application relates to the technical field of semiconductor processing, and in particular, to a method and a device for testing a product, a computer device and readable storage medium.

BACKGROUND ART

In the processing industry chain of semiconductor products, it is necessary to conduct casual inspection on the products processed by each machine, in order to control the attributes of individual aspects of the products processed by each machine (such that the products produced by each process machine can be uniformly detected, so as to monitor the process equipment capacity, stability, parameters, etc.).

In the prior art, the sampling rule is set usually according to the product serial number. For example, when it is stipulated to detect the products with tail numbers odd-numbered, if the products produced by the processing machine contain more products with tail numbers even-numbered, then as a result, the number of the tested products processed by the processing machine is relatively small, thereby reducing the accuracy of testing the qualified rate of the products processed by the processing machine.

SUMMARY

In view of this, the purpose of the present application is to provide a method and a device for testing a product, a computer device and the readable storage medium, which are beneficial to improve the accuracy of testing the qualified rate of products.

In the first aspect, an embodiment of the present application provides a method for testing a product, which is applicable to a semiconductor processing system. The semiconductor processing system comprises one testing machine and at least one processing machine, and products of a same testing cycle are sequentially transferred to individual processing machine for being processed, and the processed products are sequentially transferred to the testing machine for being tested, and during the testing machine testing the products, the method comprises:

counting a total product number and a tested-product number of processed products processed by the processing machine, for each processing machine, during a first testing stage of the testing cycle, wherein the total product number is number of all of the products which have been processed by the processing machine and then transferred to the testing machine, and the tested-product number is number of products in the processed products that meet a preset sampling rule;

calculating a product testing rate of each processing machine, for each processing machine, according to the total product number of the processing machine and the tested-product number of the processing machine;

transferring sequentially the products in unprocessed products that meet the preset sampling rule to the processing machine whose product testing rate is lower than the preset threshold for being processed, when at least one machine with the product testing rate lower than a preset threshold and at least one machine with a product testing rate higher than the preset threshold appear in the first testing stage, during a second testing stage of the testing cycle, and sequentially transferring the products in the unprocessed products that do not meet the preset sampling rule to the processing machine whose product testing rate is higher than the preset threshold to be processed, and calculating a product testing rate of each machine in the second testing stage, wherein the unprocessed products are the products that have not been processed by the processing machine in the testing cycle; and transferring sequentially the products in unprocessed products that meet the preset sampling rule to the processing machine whose product testing rate is lower than the preset threshold for being processed, when at least one machine with the product testing rate lower than a preset threshold and at least one machine with a product testing rate higher than the preset threshold appear in the second testing stage, and sequentially transferring the products in the unprocessed products that do not meet the preset sampling rule to the processing machine whose product testing rate is higher than the preset threshold to be processed, until end of current testing cycle.

Optionally, before sequentially transferring the products in a same testing cycle to individual processing machines for being processed, the method comprises:

matching with each of products of a same testing cycle, a processing machine used to process the product, and setting a product serial number for each product according to type of the product, processing steps of the product and a serial number of the processing machine to which the product belongs.

Optionally, when counting for each processing machine the total product number of processed products processed by the processing machine, the method comprises:

obtaining the product serial number of each product processed by the processing machine by a serial number collector in the processing machine; and counting an amount of the product serial numbers, as the total product number.

Optionally, when counting the tested-product number of processed products processed by the processing machine, the method comprises:

obtaining the product serial number of each product processed by the processing machine, which is collected by a serial number collector in the processing machine; and counting an amount of product serial numbers in the product serial numbers that meet a preset sampling rule, as the tested-product number.

In the second aspect, the embodiment of the present application provides a device for testing a product, wherein the device comprises:

a product-number counting module, configured to count a total product number and a tested-product number of processed products processed by the processing machine, for each processing machine, during a first testing stage of a testing cycle, wherein the total product number is number of all of the products which have been processed by the processing machine and then transferred to the testing machine, and the tested-product number is number of the products in the processed products that meet a preset sampling rule;

a first testing rate calculating module, configured to calculate a product testing rate of each processing machine, for each processing machine, according to the total product number of the processing machine and the tested-product number of the processing machine;

a second testing rate calculating module, configured to transfer sequentially the products in unprocessed products that meet the preset sampling rule to the processing machine whose product testing rate is lower than the preset threshold for being processed, when at least one machine with the product testing rate lower than a preset threshold and at least one machine with a product testing rate higher than the preset threshold appear in the first testing stage, during a second testing stage of the testing cycle, and sequentially transfer the products in the unprocessed products that do not meet the preset sampling rule to the processing machine whose product testing rate is higher than the preset threshold to be processed, and calculate a product testing rate of each machine in the second testing stage, wherein the unprocessed products are the products that have not been processed by the processing machine in the testing cycle; and a product transferring module, configured to transfer sequentially the products in unprocessed products that meet the preset sampling rule to the processing machine whose product testing rate is lower than the preset threshold for being processed, when at least one machine with the product testing rate lower than a preset threshold and at least one machine with a product testing rate higher than the preset threshold appear in the second testing stage, and sequentially transfer the products in the unprocessed products that do not meet the preset sampling rule to the processing machine whose product testing rate is higher than the preset threshold to be processed, until end of current testing cycle.

Optionally, the device further comprises:

a product serial number setting module, configured to match with each of products of a same testing cycle, a processing machine used to process the product, and set a product serial number for each product according to type of the product, processing steps of the product and a serial number of the processing machine to which the product belongs.

Optionally, when the product-number counting module counting a total product number of processed products processed by the processing machine for each processing machine, the product-number counting module is further configured to:

obtain the product serial number of each product processed by the processing machine by a serial number collector in the processing machine; and count an amount of the product serial numbers, as the total product number.

Optionally, when the product-number counting module counting the tested-product number of processed products processed by the processing machine, the product-number counting module is further configured to:

obtain the product serial number of each product processed by the processing machine, which is collected by a serial number collector in the processing machine; and count an amount of product serial numbers of the product serial numbers that meet the preset sampling rule, as the tested-product number.

In the third aspect, the embodiment of the present application provides a computer device, comprising: a processor, a memory, and a bus, wherein the memory stores machine readable instructions executable by the processor, wherein when the computer device is running, the processor and the memory communicate with each other through the bus, and when the machine readable instructions are executed by the processor, steps of the method for testing a product in any one optional embodiment in the first aspect mentioned above are performed.

In the fourth aspect, the embodiment of the present application provides a computer-readable storage medium, wherein a computer program is stored on the computer-readable storage medium, wherein when the computer program is executed by a processor, steps of the method for testing a product in any one optional embodiment in the first aspect mentioned above are performed.

In the method and the device for testing a product, the computer device, and the readable storage medium provided by the embodiments of the present application, in the first testing stage of the testing cycle, for each processing machine, the total product number and the tested-product number of the processed products processed by the processing machine are counted, wherein the total product number is the number of all of the products that have been processed by the processing machine and then transferred to the testing machine, and the tested-product number is the number of products of the processed products that meet the preset sampling rule. For each processing machine, the product testing rate of each processing machine is calculated according to the total product number of the processing machine and the tested-product number of the processing machine. In this step, after counting and analysis of the products processed by the processing machine, the product testing rate of this stage can be directly calculated. In the second testing stage of the testing cycle, when at least one machine with the product testing rate lower than a preset threshold and at least one machine with a product testing rate higher than the preset threshold appear in the first testing stage, the products in the unprocessed products that meet the preset sampling rule are sequentially transferred to the processing machine whose product testing rate is lower than the preset threshold to be processed, the products in the unprocessed products that do not meet the preset sampling rule are sequentially transferred to the processing machine whose product testing rate is higher than the preset threshold to be processed, and a product testing rate of each machine in the second testing stage is calculated, wherein the unprocessed products are the products that have not been processed by the processing machine in the testing cycle. In this step, the product testing rate of the first testing stage is judged, and the processing machine is allocated for the unprocessed products, and the cycle of the second testing stage is started. When at least one machine with the product testing rate lower than a preset threshold and at least one machine with a product testing rate higher than the preset threshold appear in the second testing stage, the products in the unprocessed products that meet the preset sampling rule are sequentially transferred to the processing machine whose product testing rate is lower than the preset threshold to be processed, and the products in the unprocessed products that do not meet the preset sampling rule are sequentially transferred to the processing machine whose product testing rate is higher than the preset threshold to be processed until end of current testing cycle. In this step, the product testing rate in the second testing stage is determined in real time, and the processing machine is allocated to the unprocessed product in real time, until all the products in the testing cycle are processed and tested. With the above method adopted, through distributing the products meeting conditions to the machines with different testing rates for being processed and tested, it is beneficial to improve the accuracy of testing the qualified rate of the products. (Without increasing the sampling rate, the products produced by each process machine can be detected regularly and quantitatively, so as to improve the yield of the production line and reduce the cost of detection.)

In order to make the above-mentioned objects, features and advantages of the present application more obvious and easy to be understood, the preferred embodiments, which are given below, are described in detail in conjunction with the drawings.

BRIEF DESCRIPTION OF DRAWINGS

In order to illustrate the technical solutions of the embodiments of the present application more clearly, the drawings required to be used in the embodiments will be briefly introduced below. It should be understood that the following drawings only show some of the embodiments of the present application, and therefore should not be regarded as a limitation on the scope. For those ordinarily skilled in the art, other related drawings can also be obtained according to these drawings without any creative efforts.

DETAILED DESCRIPTION OF EMBODIMENTS

Figure 1:
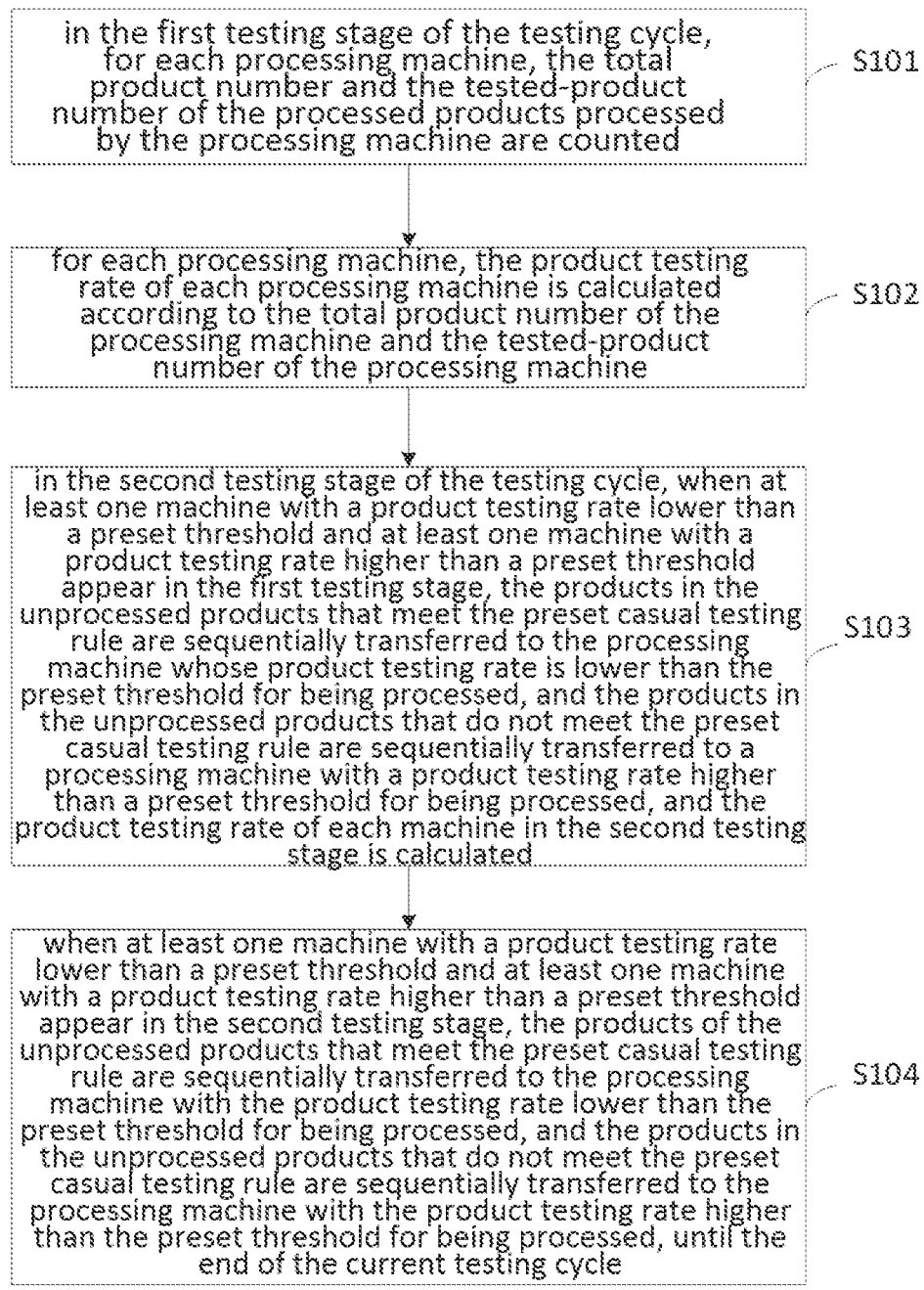
FIG. 1 shows a flowchart of a method for testing a product provided by Embodiment 1 of the present application.

In order to make the purposes, technical solutions and advantages of the embodiments of the present application clearer, the technical solutions in the embodiments of the present application will be clearly and completely described below with reference to the drawings in the embodiments of the present application. Obviously, the described embodiments are only some but not all of the embodiments of the present application. Generally, the components of the embodiments of the present application shown and illustrated in the drawings herein may be arranged and designed in a variety of different configurations. Thus, the following detailed description on the embodiments of the present application, shown in the drawings, is not intended to limit the scope of the present application as claimed, but is merely representative of selected embodiments of the present application. Based on the embodiments of the present application, all other embodiments, obtained by those skilled in the art without creative work, fall within the protection scope of the present application.

Embodiment 1

In order to facilitate the understanding on the present application, Embodiment 1 of the present application will be described in detail below with reference to the content described in the flowchart of a method for testing a product provided by Embodiment 1 of the present application, which is shown in FIG. 1.

Referring to FIG. 1, FIG. 1 shows a flowchart of a method for testing a product provided by Embodiment 1 of the present application, and the method comprises steps S101-S104.

S101, in which in the first testing stage of the testing cycle, for each processing machine, the total product number and the tested-product number of the processed products processed by the processing machine are counted, wherein the total product number is the number of all of the products which have been processed by the processing machine and then transferred to the testing machine, and the tested-product number is the number of products in the processed products that meet the preset sampling rule.

Specifically, each testing cycle comprises all the products that need to be processed and tested in the current cycle. After being processed by the individual processing machine, the individual products will be transferred sequentially to the testing machine for being tested. When calculating the product testing rate of individual machines, those of all products, which belong to the same product type and are in the same processing step, are regarded as a product group. The products in this product group are randomly transferred to the individual processing machines for being processed and then tested, that is, for the products in each product group, the processing machines used for processing do not need to be specially designated, which greatly reduces the product allocation time at this stage.

Since each of the products processed by the processing machines needs to be transferred to the testing machine for being tested, the number of products can be counted on the processing machine. The counting methods include, but are not limited to, using the quantity sensor to collect the number of objects passing through the processing machine, or collecting the identification or the serial number of the products passing therethrough and then counting the number of the identifications or the serial numbers.

It should be noted that the method for counting the total produce number and the tested-product number of processed products processed by the processing machine can be provided according to actual needs, which is not specifically limited here. The above specific description is the exemplary illustration for Embodiment 1 of the present application, which does not limit Embodiment 1 of the present application.

S102, in which for each processing machine, the product testing rate of each processing machine is calculated according to the total product number of the processing machine and the tested-product number of the processing machine.

Specifically, the calculating method is to divide the tested-product number of the processing machine by the total product number of the processing machine to obtain by calculation the product testing rate of each processing machine used to indicate the percentage of the tested products to the total product number.

S103, in which in the second testing stage of the testing cycle, when at least one machine with a product testing rate lower than a preset threshold and at least one machine with a product testing rate higher than a preset threshold appear in the first testing stage, the products in the unprocessed products that meet the preset sampling rule are sequentially transferred to the processing machine whose product testing rate is lower than the preset threshold for being processed, and the products in the unprocessed products that do not meet the preset sampling rule are sequentially transferred to a processing machine with a product testing rate higher than a preset threshold for being processed, and the product testing rate of each machine in the second testing stage is calculated, wherein the unprocessed products are the products which have not yet been processed by the processing machine in the testing cycle.

Specifically, when the first testing stage of the testing cycle ends, it enters the second testing stage. Since the product processed by each processing machine, at this time, is the one which is randomly transferred to the processing machine in the first stage, and the unprocessed products have not been allocated, so that when judging how to distribute the first product in the second testing stage, it is necessary to determine the product processing rate of individual machines in the first testing stage.

When at least one machine whose product testing rate is lower than the preset threshold and at least one machine whose product testing rate is higher than the preset threshold appear in the first testing stage, the products of the unprocessed products that meet the preset sampling rule, which are the products with the attribute same as the products tested in the first testing stage in a certain dimension, are transferred to the processing machine whose product testing rate is lower than the preset threshold for being processed, so that the total product number processed and the tested-product number processed by the processing machine are increased simultaneously, and thus the product testing rate of the processing machine is increased.

The products of the unprocessed products that do not meet the preset sampling rule, which are the products without the attribute same as the products tested in the first testing stage in this certain dimension, are transferred to the processing machine whose product testing rate is higher than the preset threshold for being processed, so that the total product number processed by the processing machine is increased, but the tested-product number remains unchanged, and thus the product testing rate of the processing machine is decreased.

S104, in which when at least one machine with a product testing rate lower than a preset threshold and at least one machine with a product testing rate higher than a preset threshold appear in the second testing stage, the products of the unprocessed products that meet the preset sampling rule are sequentially transferred to the processing machine with the product testing rate lower than the preset threshold for being processed, and the products in the unprocessed products that do not meet the preset sampling rule are sequentially transferred to the processing machine with the product testing rate higher than the preset threshold for being processed, until the end of the current testing cycle.

Specifically, during the cycle judgment and the product allocation in the second testing stage, the product testing rate of the machine in the second testing stage is determined and the unprocessed products are allocated, so that specified products are processed by the processing machine whose product testing rate is originally lower than the preset threshold, which increases the product testing rate of the machine; and specified products are processed by the processing machine whose product testing rate is originally higher than the preset threshold, which decreases the product testing rate of the machine, and therefore, the product testing rates of all the machines are gradually stabilized and remained near the preset threshold.

In a feasible embodiment, before the products of the same testing cycle are sequentially transferred to individual processing machines for being processed, the method comprises:
matching with each product of the same testing cycle, the processing machine used to process the product, and setting for each product the product serial number, according to the type of the product, the processing steps of the product and the serial number of the processing machine to which the product belongs.

Specifically, since each product has its own unique product serial number, which is used to indicate the product identity, it is necessary to make all products numbered before being transferred to the processing machine. According to the product type, product processing steps, and the processing machine, the serial number is made to the product, if more than one product belonging to the same product type, having same processing steps and belonging to the same processing machine, the product serial number will be specially marked to distinguish the above different products, so that all products have their own unique identification information.

In a feasible embodiment, when counting the total product number of the processed products processed by the processing machine for each processing machine, the method comprises:
obtaining the product serial number of each product processed by the processing machine by a serial number collector in the processing machine; and counting an amount of the product serial numbers, as the total product number.

Specifically, since each product has a unique serial number, when the number of products is counted, the serial numbers on the products can be collected by the serial number collector in the processing machine. After the collection of all serial numbers is completed, the number of the collected serial numbers is counted as the total product number.

In a feasible embodiment, when counting the tested-product number of the processed products processed by the processing machine, the method comprises:
obtaining the product serial number of each product processed by the processing machine, which is collected by a serial number collector in the processing machine; and counting the number of product serial numbers of the product serial numbers that meet the preset sampling rule, as the tested-product number.

Specifically, after the serial numbers of all products are collected, the serial numbers are identified and analyzed, the number of product serial numbers that meet the preset sampling rule is obtained by counting, and the obtained number of serial numbers is used as the tested-product number.

Figure 2:
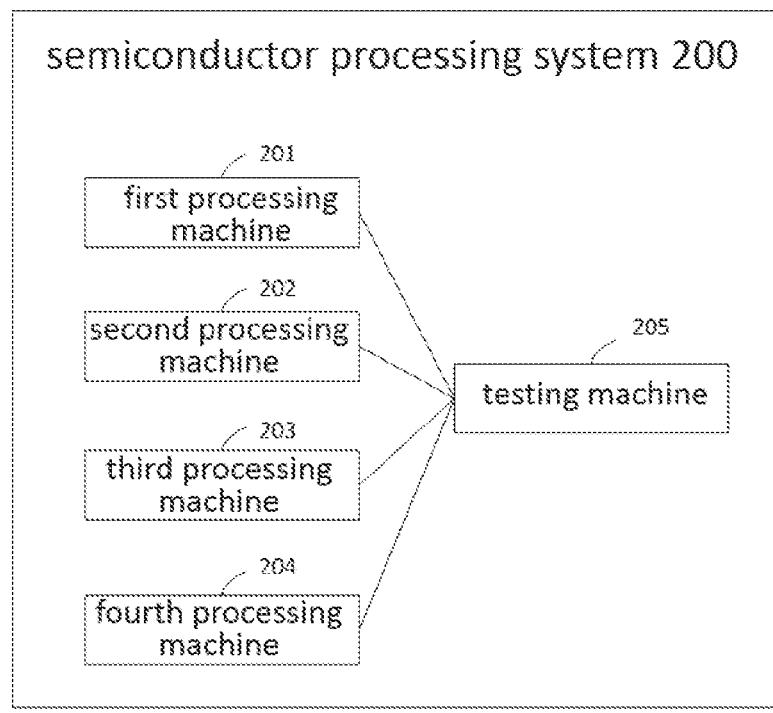
FIG. 2 shows a schematic diagram of a semiconductor processing system provided by Embodiment 1 of the present application.

The technical solution provided by the present application is described below with reference to a specific embodiment. FIG. 2 shows a schematic diagram of a semiconductor processing system provided by Embodiment 1 of the present application, wherein the semiconductor processing system 200 comprises a first processing machine 201, the second processing machine 202, the third processing machine 203, the fourth processing machine 204, and the testing machine 205. When the semiconductor processing system executes the method provided by Embodiment 1 of the present application, it specifically executes steps S201-S206.

S201, in which with the products of the same type with the same processing steps as an example, there are 13 products of the same type, in the same processing step, in this testing cycle, wherein the serial numbers are respectively Product 1, Product 2, Product 3, Product 4, Product 5, Product 6, Product 7, Product 8, Product 9, Product 10, Product 11, Product 12, and Product 13. In the first testing stage of this cycle, 10 products in the above are randomly transferred to the first processing machine, the second processing machine, the third processing machine and the fourth processing machine for being processed. Here, Product 1, Product 2, and Product 3 are transferred to the first processing machine; Product 4, Product 5, and Product 6 are transferred to the second processing machine; and Product 7, Product 8, Product 9, and Product 10 are transferred to the third processing machine.

S202, in which according to the preset sampling rule, the products with odd-numbered tail number of product serial numbers are selected for being tested and the product testing rate of each processing machine is calculated. According to the amount and the serial numbers of products processed by each processing machine in Step 1, it is obtained that the product testing rate of the first processing machine is 66.66%, the product testing rate of the second processing machine is 33.33%, the product testing rate of the third processing machine is 50%, and the product testing rate of the fourth processing machine is 0%.

S203, in which, entering the second product testing stage, the relationship between the product testing rates of the first processing machine, the second processing machine and the third processing machine and the preset threshold of 50% is first determined, it can be obtained that the product testing rate of the first processing machine is higher than the preset threshold, and the product testing rates of the second processing machine and the fourth processing machine are lower than the preset threshold, and then Product 11 of the remaining unprocessed products, Product 11, Product 12 and Product 13, is transferred to the second processing machine or the fourth processing machine for being processed. As an example in which it is transferred to the four processing machine, the obtained product processing rate of the current fourth processing machine is 100%.

S204, in which the product testing rates of the individual processing machines are re-determined, wherein since currently the product testing rates of the first processing machine and the fourth processing machine are both greater than the preset threshold, and the product testing rate of the second processing machine is lower than the preset threshold, the product 12 is transferred into the first processing machine or the fourth processing machine, wherein as an example in which it is transferred to the fourth processing machine, the current product testing rate of the fourth processing machine is 50%.

S205, in which the product testing rates of the individual processing machines are re-determined, wherein since currently the product testing rate of the first processing machine is greater than the preset threshold and the product testing rate of the second processing machine is lower than the preset threshold, the product 13 is transferred into the second processing machine, and the product testing rate of the second processing machine is 50%.

S206, in which in this cycle, all products are processed and tested completely, the test is finished and it is obtained that the product testing rate of the first processing machine is 66.66%, the product testing rate of the second processing machine is 50%, the product testing rate of the third processing machine is 50%, the product testing rate of the fourth processing machine is 50% and the product testing rates of all machines tend to be stable and remain near the preset threshold of 50%.

When Steps S201-S206 are applied to a semiconductor manufacturing platform which is formed by integrating the MES (manufacturing execution system), the EAP (machine automation program) and the RTD (real-time dispatch system), the method comprises S301-S304.

S301, in which the user sets a preset threshold testing rate in the MES.

S302, in which the EAP adds a field of the processing machine onto the product every time when the product passes through the processing machine.

S303, in which the RTD system counts the current testing rate of each dimension in real time, and reports to the MES the processing machine with a low testing rate.

S304, in which the MES selects actively the qualified batches according to the field of the processing machine, so as to make them enter the testing step.

Embodiment 1 of the present application further provides a second method for testing a product for testing products, which is applied to a second semiconductor processing system, wherein the second semiconductor processing system comprises a fifth processing machine and a second testing machine, with the second method for testing a product comprising steps S401-S406.

S401, in which for the fifth processing machine, Product 21, Product 22, Product 23, Product 24, Product 25, and Product 26 belonging to the fifth processing machine are sequentially transferred to the fifth processing machine for being processed, and the processed products are transferred to the second testing machine for being tested.

S402, in which when the processed product 21 is transferred to the second testing machine, whether the product testing rate of the machine is less than a preset threshold at this time is calculated and judged, wherein if the product testing rate of the machine is smaller than the preset threshold at this time, then the current product is tested; and if the product testing rate of the machine is equal to or greater than the preset threshold at this time, then the current product will not be tested. Here, it is assumed that the preset threshold is 50%, because Product 21 is the first one which is transferred to the second testing machine and has not yet been tested, at this time, the total product number is 1, and the number of tested products is 0, and then the current product testing rate is 0, and it is determined that the current product testing rate is less than the preset threshold, the current product 21 is tested, so that the product testing rate after the testing is 100%.

S403, in which when the processed product 22 is transferred to the second testing machine, the total product number is 2 and the number of tested products is 1 at this time, and then the current product testing rate is 50%, wherein since the current product testing rate is equal to the preset threshold, the current product 22 is not tested, so that the current product testing rate is 50%.

S404, in which when the processed product 23 is transferred to the second testing machine, the total product number is 3 and the number of tested products is 1 at this time, and then the current product testing rate is 33.33%, wherein since the current product testing rate is less than the preset threshold, the current product 23 is tested, so that the product testing rate after the testing is 66.66%.

S405: in which when the processed product 24 is transferred to the second testing machine, the total product number is 4 and the number of tested products is 2 at this time, and then the current product testing rate is 50%, wherein since the current product testing rate is equal to the preset threshold, the current product 24 is not tested, so that the current product testing rate is 50%.

S406, in which the above method is repeated until all of the products are processed and tested, so that the testing rate of the machine is kept above the preset threshold; and in all processing machines, the products are tested according to Steps S401-S406.

When Steps S401-S406 are applied to a semiconductor manufacturing platform which is formed by integrating the MES (manufacturing execution system), the EAP (machine automation program) and the RTD (real-time dispatch system), the method comprises S501-S505.

S501, in which the user sets a preset sampling rule in the MES.

S502, in which the RTD system counts the current testing rate of the individual dimensions in real time.

S503, in which the RTD actively dispatches the products of qualified batches to the processing machines whose testing rate is lower than a preset threshold.

S504, in which the EAP selects the correct processing machine to process products of this batch.

S505, in which when the testing rates are all the preset threshold, the products are still processed and tested according to the preset sampling rule.

Embodiment 2

Figure 3:
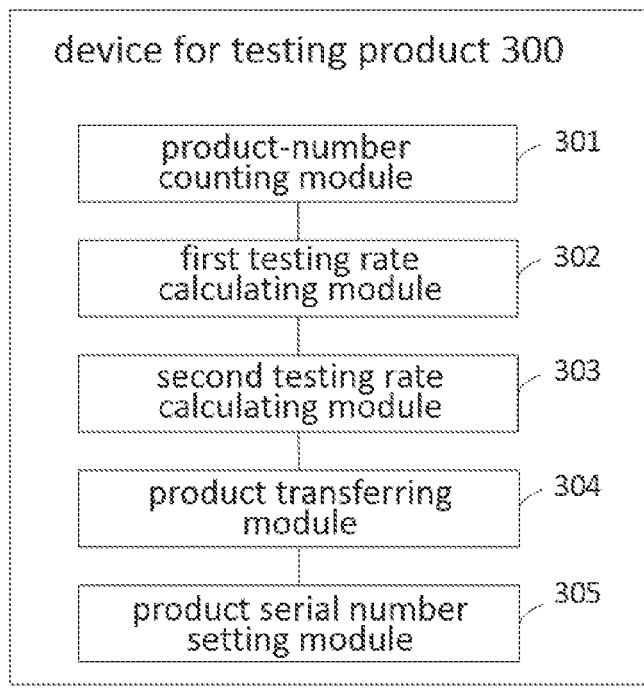
FIG. 3 shows a schematic structural diagram of a device for testing a product provided by Embodiment 2 of the present application.

Referring to FIG. 3, FIG. 3 shows a schematic structural diagram of a device for testing a product provided by Embodiment 2 of the present application, wherein the device for testing a product 300 comprises:

a product-number counting module 301, configured for counting a total product number and a tested-product number of processed products processed by the processing machine, for each processing machine, during a first testing stage of a testing cycle, wherein the total product number is number of all of the products which have been processed by the processing machine and then transferred to the testing machine, and the tested-product number is number of the products in the processed products that meet a preset sampling rule;

a first testing rate calculating module 302, configured for calculating a product testing rate of each processing machine, for each processing machine, according to the total product number of the processing machine and the tested-product number of the processing machine;

a second testing rate calculating module 303, configured for transferring sequentially the products in unprocessed products that meet the preset sampling rule to the processing machine whose product testing rate is lower than the preset threshold for being processed, when at least one machine with the product testing rate lower than a preset threshold and at least one machine with a product testing rate higher than the preset threshold appear in the first testing stage, during a second testing stage of the testing cycle, and sequentially transferring the products in the unprocessed products that do not meet the preset sampling rule to the processing machine whose product testing rate is higher than the preset threshold to be processed, and calculating a product testing rate of each machine in the second testing stage, wherein the unprocessed products are the products that have not been processed by the processing machine in the testing cycle; and a product transferring module 304, configured for transferring sequentially the products in unprocessed products that meet the preset sampling rule to the processing machine whose product testing rate is lower than the preset threshold for being processed, when at least one machine with the product testing rate lower than a preset threshold and at least one machine with a product testing rate higher than the preset threshold appear in the second testing stage, and sequentially transferring the products in the unprocessed products that do not meet the preset sampling rule to the processing machine whose product testing rate is higher than the preset threshold to be processed, until end of current testing cycle.

In a feasible embodiment, the device further comprises:

a product serial number setting module 305, configured for matching with each of products of a same testing cycle, a processing machine used to process the product, and setting a product serial number for each product according to type of the product, processing steps of the product and a serial number of the processing machine to which the product belongs.

In a feasible embodiment, when the product-number counting module counting a total product number of processed products processed by the processing machine for each processing machine, the product-number counting module is further configured for:

obtaining the product serial number of each product processed by the processing machine, by a serial number collector in the processing machine; and counting an amount of the product serial numbers, as the total product number.

In a feasible embodiment, when the product-number counting module counting the tested-product number of processed products processed by the processing machine, the product-number counting module is further configured for:

obtaining the product serial number of each product processed by the processing machine, which is collected by a serial number collector in the processing machine; and counting an amount of those of the product serial numbers that meet the preset sampling rule, as the tested-product number.

Embodiment 3

Figure 4:
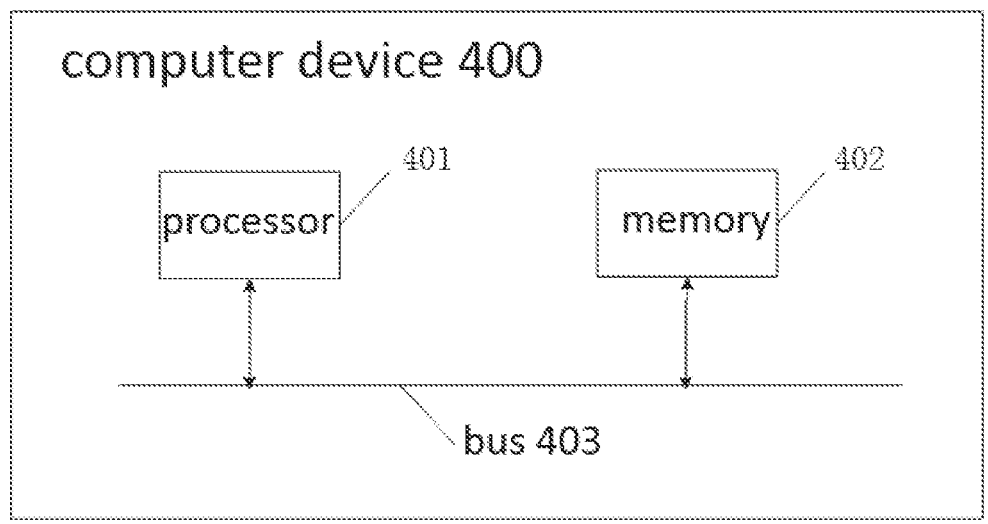
FIG. 4 shows a schematic structural diagram of a computer device provided by Embodiment 3 of the present application.

Based on the same technical concept, referring to FIG. 4, FIG. 4 shows a schematic structural diagram of a computer device provided in Embodiment 3 of the present application, wherein the computer device 400 provided by Embodiment 3 of the present application, as shown by FIG. 4, comprises:

a processor 401, a memory 402, and a bus 403, wherein the memory 402 stores machine readable instructions executable by the processor 401, wherein when the computer device 400 is running, the processor 401 and the memory 402 communicate with each other through the bus 403. The machine readable instructions, when being executed by the processor 401, perform the steps of the method for testing a product provided in Embodiment 1 above.

Embodiment 4

Based on the same technical concept, an embodiment of the present application also provides a computer-readable storage medium, wherein a computer program is stored on the computer-readable storage medium, wherein the computer program, when being run by a processor, executes the steps of a method for testing a product of any one of the foregoing embodiments.

Those skilled in the art can clearly understand that, for the convenience and brevity of description, the corresponding process in the foregoing method embodiments may be referred to, for the specific working process of the system and device described above, which will not be repeated here.

The computer program product for testing a product provided by the embodiments of the present application comprises a computer-readable storage medium storing program codes, and the instructions contained in the program codes can be used to execute the methods described in the foregoing method embodiments. The method embodiments may be referred to, for the specific implementation, which is not repeated here.

The device for testing a product provided by the embodiment of the present application may be specific hardware on the device or software or firmware installed on the device, or the like. The implementation principle and the produced technical effects of the device provided by the embodiment of the present application are the same as those of the foregoing method embodiments. For brief description, the parts of the device embodiment, which are not mentioned, may be obtained by referring to the corresponding content in the foregoing method embodiments. Those skilled in the art can clearly understand that, for the convenience and brevity of the description, all of the specific working processes of the systems, devices and units described above can be obtained by referring to the corresponding processes in the above method embodiments, which will not be repeated here.

In the embodiments provided by the present application, it should be understood that the disclosed device and method may be implemented in other manners. The device embodiments described above are only illustrative. For example, the division of the units is only a logical functional division. In actual implementation, there may be other division methods. Again, for example, plural units or components may be combined or integrated into another system, or some features can be ignored, or not implemented. On the other hand, the shown or discussed mutual coupling or direct coupling or communicating connection may be the indirect coupling or communicating connection through some communicating interfaces, devices or units, which may be in electrical, mechanical or in other forms.

The unit described as a separate component may or may not be physically separated, and the components displayed as a unit may or may not be a physical unit, that is, may be located in one place, or may be allocated to plural network units. Some or all of the units may be selected according to actual need, to achieve the purpose of the technical solution in this embodiment.

In addition, individual functional units in the embodiments provided by the present application may be integrated into one processing unit, or the individual units may exist physically alone, or two or more units may be integrated into one unit.

The functions, if implemented in the form of the software functional unit and sold or used as an independent product, may be stored in a computer-readable storage medium. Based on this understanding, the technical solution of the present application in essence, or the part of the technical solution that contributes to the prior art or the part of the technical solution can be embodied in the form of a software product. The computer software product is stored in a storage medium, including plural instructions, which are used to cause a computer device (which may be a personal computer, a server, or a network device, etc.) to execute all or part of the steps of the methods described in the various embodiments of the present application. The aforementioned storage medium comprises: U disk, mobile hard disk, read-only memory (ROM), random access memory (RAM), magnetic disk or optical disk and other media that can store program codes.

It should be noted that like numerals and letters refer to like items in the following figures, so that once an item is defined in one figure, it does not require further definition and explanation in subsequent figures, Furthermore, the terms "first", "second", "third", etc. are only used to describe the distinguishing and should not be construed as indicating or implying the importance of relativity.

Finally, it should be noted that the above-mentioned embodiments are only specific embodiments of the present application, and they are used to illustrate the technical solutions of the present application, but not to limit the present application. The protection scope of the present application is not limited to this. Although the present application has been described in detail referring to the foregoing embodiments, those ordinarily skilled in the art should understand that: any person skilled in the art who is familiar with the technical field, within the technical scope disclosed by the present application, can still modify the technical solutions described in the foregoing embodiments, or easily conceive of changes or make equivalent replacements to some of the technical features. These modifications, changes or replacements do not make the essence of the corresponding technical solutions deviate from the spirit and scope of the technical solutions of the embodiments of the present application, all of which should be covered by the protection scope of the present application. Therefore, the protection scope of the present application should be based on the protection scope of the claims.

What is claimed is:

1. A method for testing a product, applicable to a semiconductor processing system, wherein the semiconductor processing system comprises one testing machine and at least one processing machine, wherein the testing machine is connected with the at least one processing machine through a communication interface, and products of a same testing cycle are sequentially transferred to individual processing machines for being processed, and processed products are sequentially transferred to the testing machine for being tested, and during the testing machine tests the products, the method comprises:

counting, for each processing machine, a total product number and a tested-product number of processed products processed by the processing machine during a first testing stage of the testing cycle, wherein the total product number is number of all of products which have been processed by the processing machine and then transferred to the testing machine, and the tested-product number is number of products in processed products that meet a preset sampling rule;

calculating a product testing rate of each processing machine, for each processing machine, according to the total product number of the processing machine and the tested-product number of the processing machine;

transferring sequentially products in unprocessed products that meet the preset sampling rule to a processing machine whose product testing rate is lower than a preset threshold for being processed, when at least one machine with a product testing rate lower than the preset threshold and at least one machine with a product testing rate higher than the preset threshold appear in the first testing stage, during a second testing stage of the testing cycle, and sequentially transferring products in the unprocessed products that do not meet the preset sampling rule to a processing machine whose product testing rate is higher than the preset threshold to be processed, and calculating a product testing rate of each machine in the second testing stage, wherein the unprocessed products are products that have not been processed by the processing machine in the testing cycle; and transferring sequentially products in the unprocessed products that meet the preset sampling rule to a processing machine whose product testing rate is lower than the preset threshold for being processed, when at least one machine with a product testing rate lower than the preset threshold and at least one machine with a product testing rate higher than the preset threshold appear in the second testing stage, and sequentially transferring products in the unprocessed products that do not meet the preset sampling rule to a processing machine whose product testing rate is higher than the preset threshold to be processed, until end of current testing cycle.

2. The method according to claim 1, wherein before sequentially transferring products in a same testing cycle to individual processing machines for being processed, the method comprises:

matching with each product of the same testing cycle, a processing machine used to process the product, and setting a product serial number for each product according to a type of the product, processing steps of the product and a serial number of the processing machine to which the product belongs.

3. The method according to claim 1, wherein when counting for each processing machine the total product number of processed products processed by the processing machine, the method comprises:

obtaining a product serial number of each product processed by the processing machine, by a serial number collector in the processing machine; and counting an amount of product serial numbers, as the total product number.

4. The method according to claim 1, wherein when counting the tested-product number of processed products processed by the processing machine, the method comprises:

obtaining a product serial number of each product processed by the processing machine, which is collected by a serial number collector in the processing machine; and counting an amount of product serial numbers in product serial numbers that meet the preset sampling rule, as the tested-product number.

5. A device for testing a product, wherein the device comprises:

a product-number counting module, configured to count, for each processing machine, a total product number and a tested-product number of processed products processed by the processing machine during a first testing stage of a testing cycle, wherein the total product number is number of all of products which have been processed by the processing machine and then transferred to a testing machine, and the tested-product number is number of products in processed products that meet a preset sampling rule;

a first testing rate calculating module, configured to calculate a product testing rate of each processing machine, for each processing machine, according to the total product number of the processing machine and the tested-product number of the processing machine;

a second testing rate calculating module, configured to transfer sequentially products in unprocessed products that meet the preset sampling rule to a processing machine whose product testing rate is lower than a preset threshold for being processed, when at least one machine with a product testing rate lower than the preset threshold and at least one machine with a product testing rate higher than the preset threshold appear in the first testing stage, during a second testing stage of the testing cycle, sequentially transfer products in the unprocessed products that do not meet the preset sampling rule to a processing machine whose product testing rate is higher than the preset threshold to be processed, and calculate a product testing rate of each machine in the second testing stage, wherein the unprocessed products are products that have not been processed by the processing machine in the testing cycle; and a product transferring module, configured to transfer sequentially products in the unprocessed products that meet the preset sampling rule to a processing machine whose product testing rate is lower than the preset threshold for being processed, when at least one machine with a product testing rate lower than the preset threshold and at least one machine with a product testing rate higher than the preset threshold appear in the second testing stage, and sequentially transfer products in the unprocessed products that do not meet the preset sampling rule to a processing machine whose product testing rate is higher than the preset threshold to be processed, until end of current testing cycle.

6. The device according to claim 5, wherein the device further comprises:

a product serial number setting module, configured to match with each product of a same testing cycle, a processing machine used to process the product, and setting a product serial number for each product according to a type of the product, processing steps of the product and a serial number of the processing machine to which the product belongs.

7. The device according to claim 5, wherein when counting the total product number of processed products processed by the processing machine for each processing machine, the product-number counting module is further configured to:

obtain a product serial number of each product processed by the processing machine, by a serial number collector in the processing machine; and count an amount of product serial numbers, as the total product number.

8. The device according to claim 5, wherein when counting the tested-product number of processed products processed by the processing machine, the product-number counting module is further configured to:

obtain a product serial number of each product processed by the processing machine, which is collected by a serial number collector in the processing machine; and count an amount of product serial numbers in product serial numbers that meet the preset sampling rule, as the tested-product number.

9. A computer device, comprising: a processor, a memory, and a bus, wherein the memory stores machine readable instructions executable by the processor, wherein when the computer device is running, the processor and the memory communicate with each other through the bus, and when the machine readable instructions are executed by the processor, steps of the method for testing a product according to claim 1 are performed.

* * * * *